US011940686B2

(12) United States Patent
Stewart et al.

(10) Patent No.: US 11,940,686 B2
(45) Date of Patent: Mar. 26, 2024

(54) SPATIAL LIGHT MODULATOR INCORPORATING ABERRATION CORRECTION

(71) Applicant: II-VI Delaware, Inc., Wilmington, DE (US)

(72) Inventors: Luke Stewart, Gladesville (AU); Glen W Baxter, Hornsby Heights (AU); Jeremy Bolger, Sydney (AU)

(73) Assignee: II-VI DELAWARE, INC., Wilmington, DE (US)

( * ) Notice: Subject to any disclaimer, the term of this patent is extended or adjusted under 35 U.S.C. 154(b) by 56 days.

(21) Appl. No.: 17/658,922

(22) Filed: Apr. 12, 2022

(65) Prior Publication Data
US 2023/0324733 A1 Oct. 12, 2023

(51) Int. Cl.
| | | |
|---|---|---|
| *G02F 1/1335* | (2006.01) | |
| *G02B 5/18* | (2006.01) | |
| *G02B 27/00* | (2006.01) | |
| *G02F 1/1343* | (2006.01) | |

(52) U.S. Cl.
CPC ..... *G02F 1/133504* (2013.01); *G02B 5/1819* (2013.01); *G02B 27/0037* (2013.01); *G02F 1/133553* (2013.01); *G02F 1/13356* (2021.01); *G02F 1/13439* (2013.01)

(58) Field of Classification Search
CPC ............ G02F 1/13439; G02F 1/13356; G02F 1/133553; G02F 1/133504; G02B 27/0037; G02B 5/1819
See application file for complete search history.

(56) References Cited

U.S. PATENT DOCUMENTS

| | | | |
|---|---|---|---|
| 10,859,739 B2 | 12/2020 | Stewart et al. | |
| 2013/0070326 A1 | 3/2013 | Frisken et al. | |
| 2013/0177272 A1 | 7/2013 | Stewart et al. | |
| 2014/0347733 A1 | 11/2014 | Stewart et al. | |
| 2016/0291405 A1* | 10/2016 | Frisken | ............ G02F 1/136277 |
| 2017/0010463 A1* | 1/2017 | Morizur | ................ G01J 1/4257 |
| 2019/0302330 A1 | 10/2019 | Stewart et al. | |
| 2019/0317256 A1* | 10/2019 | Gulati | .................. G02B 3/0018 |

* cited by examiner

*Primary Examiner* — Mariam Qureshi
(74) *Attorney, Agent, or Firm* — Blank Rome LLP

(57) ABSTRACT

A spatial light modulator (100) comprises a liquid crystal material (104), first and second electrodes (106, 108) disposed on opposing sides of the liquid crystal material (104), and a diffractive optical element (120) disposed between the electrodes (106, 108) and extending laterally across the modulator (100). The diffractive optical element (120) comprises an array of diffracting formations (122) formed from sub-wavelength structures. The array of diffracting formations (122) defines a phase profile adapted to modify the incident wavefront of light reflected off the second electrode and to apply a position-dependent wavefront correction to the incident wavefront of light.

20 Claims, 10 Drawing Sheets

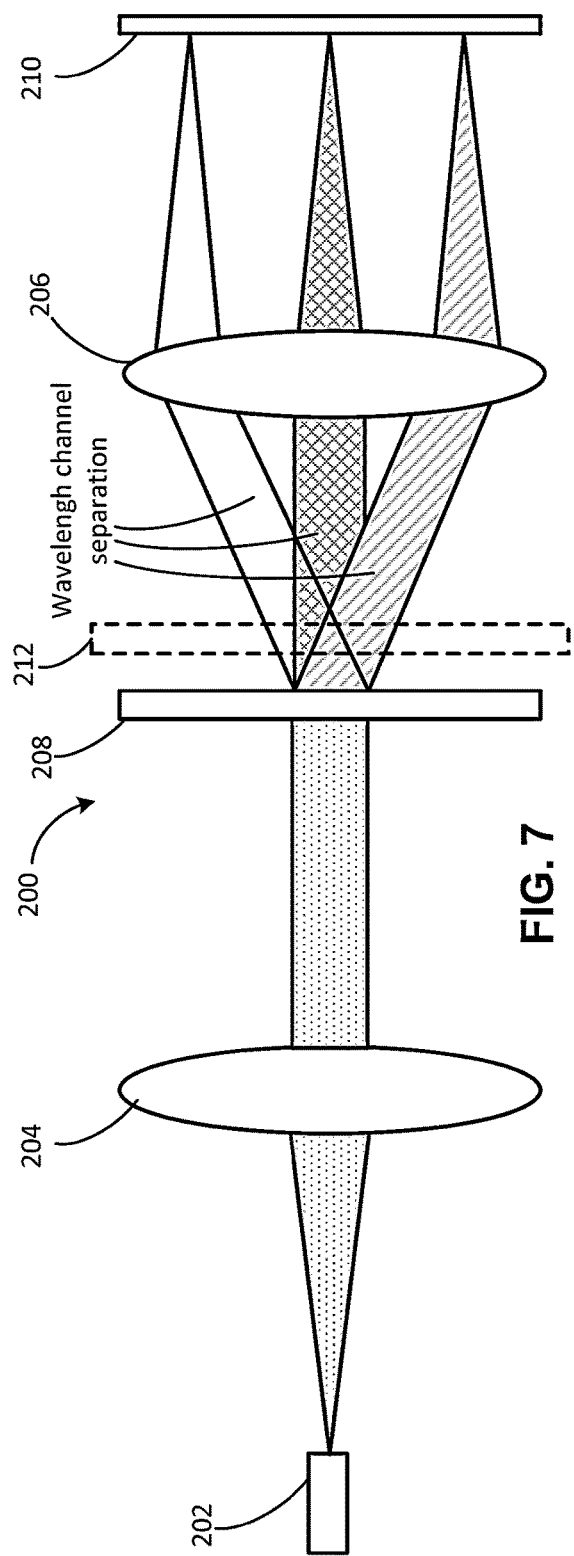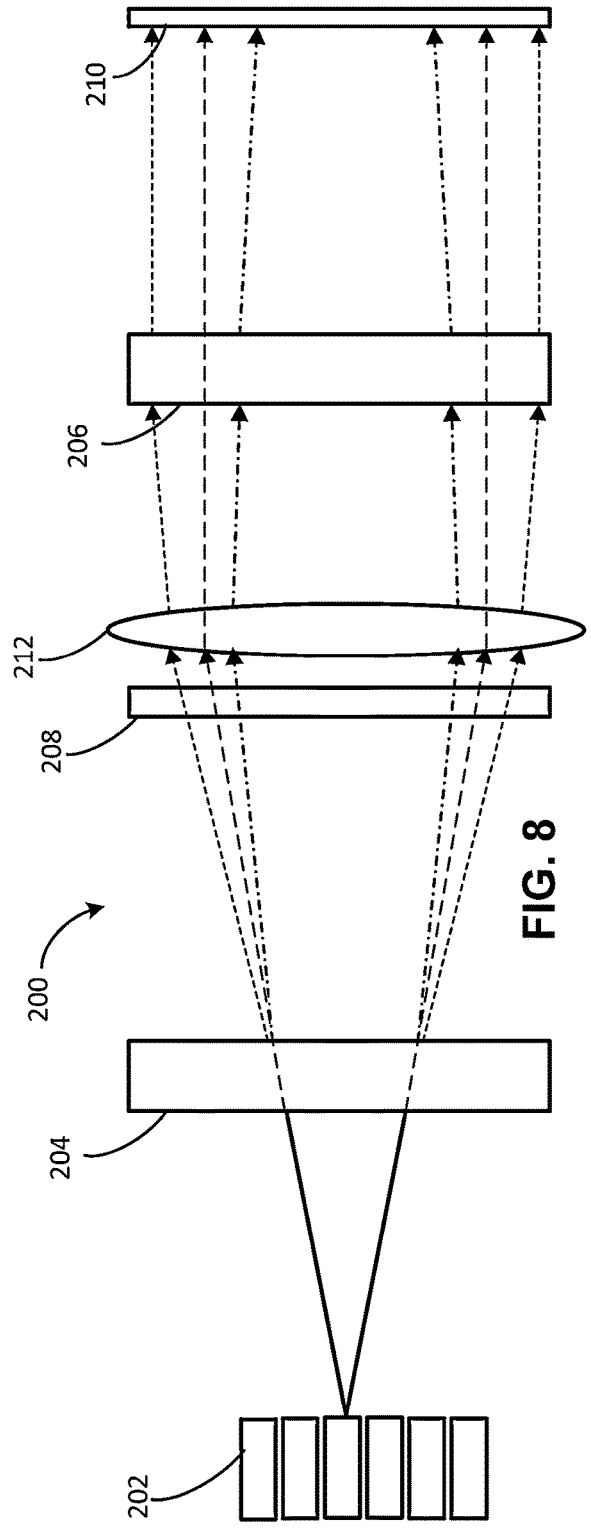

SPATIAL LIGHT MODULATOR INCORPORATING ABERRATION CORRECTION

FIELD OF THE DISCLOSURE

The subject matter of the present disclosure relates to spatial light modulator devices and in particular to liquid crystal spatial light modulators. Embodiments disclosed herein are particularly adapted for liquid crystal on silicon devices used for switching wavelength channels in a wavelength selective switch. However, it will be appreciated that the subject matter disclosed herein is applicable in broader contexts and other applications.

BACKGROUND

Liquid crystal on silicon (LCOS) spatial light modulator devices are typically used for switching optical wavelength channels in wavelength selective switch (WSS) devices. Although the phase modulation provided by these devices can be used for wavefront correction of the reflected light field, this typically comes at the cost of reduced phase available for switching and for fine-tuning the performance and attenuation of individual wavelength channels.

US Patent Application Publication 2013/0070326 relates to embedding a sub-wavelength grating providing an anisotropic refractive index profile into an LCOS spatial light modulator to introduce a relative phase difference of substantially 180° to light incident through the liquid crystal element. This acts to rotate each polarization component into the orthogonal orientation on reflection, thus making the device response independent of polarization.

US Patent Application Publication 2016/0291405 relates to an LCOS spatial light modulator having one or more sub-wavelength grating structures incorporated therein. By adjusting parameters of the grating structure, it is made to be highly reflective and more reflective than the LCOS back plane, thereby enhancing the reflectivity of the device.

However, the devices of US 2013/0070326 and US 2016/0291405 do not provide any spatially varying phase control to LCOS spatial light modulators used for optical switching or beam shaping.

Any discussion of the background art throughout the specification should in no way be considered as an admission that such art is widely known or forms part of common general knowledge in the field.

SUMMARY OF THE DISCLOSURE

In accordance with a first aspect of the present disclosure, a spatial light modulator comprises a liquid crystal material, first and second electrodes, and a diffractive optical element. The first and second electrodes are disposed on opposing sides of the liquid crystal material and are connected to an electric circuit for applying an electric potential across the liquid crystal material. The first electrode is at least partially transparent to allow passage of an incident wavefront of light into the liquid crystal material, and the second electrode is reflective and divided into a two-dimensional array of independently electrically controllable pixels that extend laterally across the spatial light modulator.

The diffractive optical element is disposed between the first and second electrodes and extends laterally across the spatial light modulator. The diffractive optical element has an array of diffracting formations formed from sub-wavelength structures. The array of diffracting formations defines a phase profile adapted to modify the incident wavefront of light reflected off the second electrode and to apply a position-dependent wavefront correction to the reflected wavefront of light.

Preferably, the diffractive formations are formed of a first material having a high refractive index that is surrounded by one or more second materials having a lower refractive index than the first material.

The diffractive optical element can impart a phase change as a function of position which provides a position-dependent focusing effect to the reflected wavefront of light. The position-dependent focusing effect can comprise focusing or defocusing at least a part of the reflected wavefront. In some embodiments, the diffractive optical element creates a position-dependent beam steering effect to selectively orient the direction of at least a part of the reflected wavefront of light. In some embodiments, the position-dependent focusing and/or beam steering effects are applied in orthogonal dimensions.

In some embodiments, the spatial light modulator is configured for use in a given wavelength selective switch (WSS) having an optical model. The diffractive optical element defines a phase surface that imparts a phase change as a function of position. The phase surface is defined by the optical model for the given WSS.

In some embodiments, the two-dimensional array of independently electrically controllable pixels is partitioned into different spatial regions which perform independent switching. In some embodiments, the different spatial regions are configured to independently control different WSS devices. In some embodiments, different spatial segments of the diffractive optical element corresponding to the different spatial regions are configured to apply an independent phase correction to each spatial region.

In some embodiments, the diffractive optical element is a sub-wavelength grating structure, wherein the sub-wavelength grating structure comprises an array of diffracting formations that extend in a two-dimensional plane, and the diffracting formations are distributed with a spatial period that varies across the two-dimensional plane. In some embodiments, the sub-wavelength grating structure has a profile of curved grating lines with curvature in a lateral direction across the spatial light modulator.

In some embodiments, the diffractive optical element comprises a sub-wavelength grating structure different to a high contrast grating. The sub-wavelength grating structure can be defined by a layer of metallic material disposed adjacent a layer of dielectric material. The metallic material can include a locally periodic matrix of sub-wavelength structures that cause a position-dependent modification to the phase of light which is reflected from it.

The foregoing summary is not intended to summarize each potential embodiment or every aspect of the present disclosure.

BRIEF DESCRIPTION OF THE FIGURES

FIG. 7 is a schematic view of a WSS device as viewed along a wavelength dispersive axis.

FIG. 8 is a schematic view of the WSS device of FIG. 7 as viewed along a switching axis.

DETAILED DESCRIPTION

1. System Overview

Figure 1:
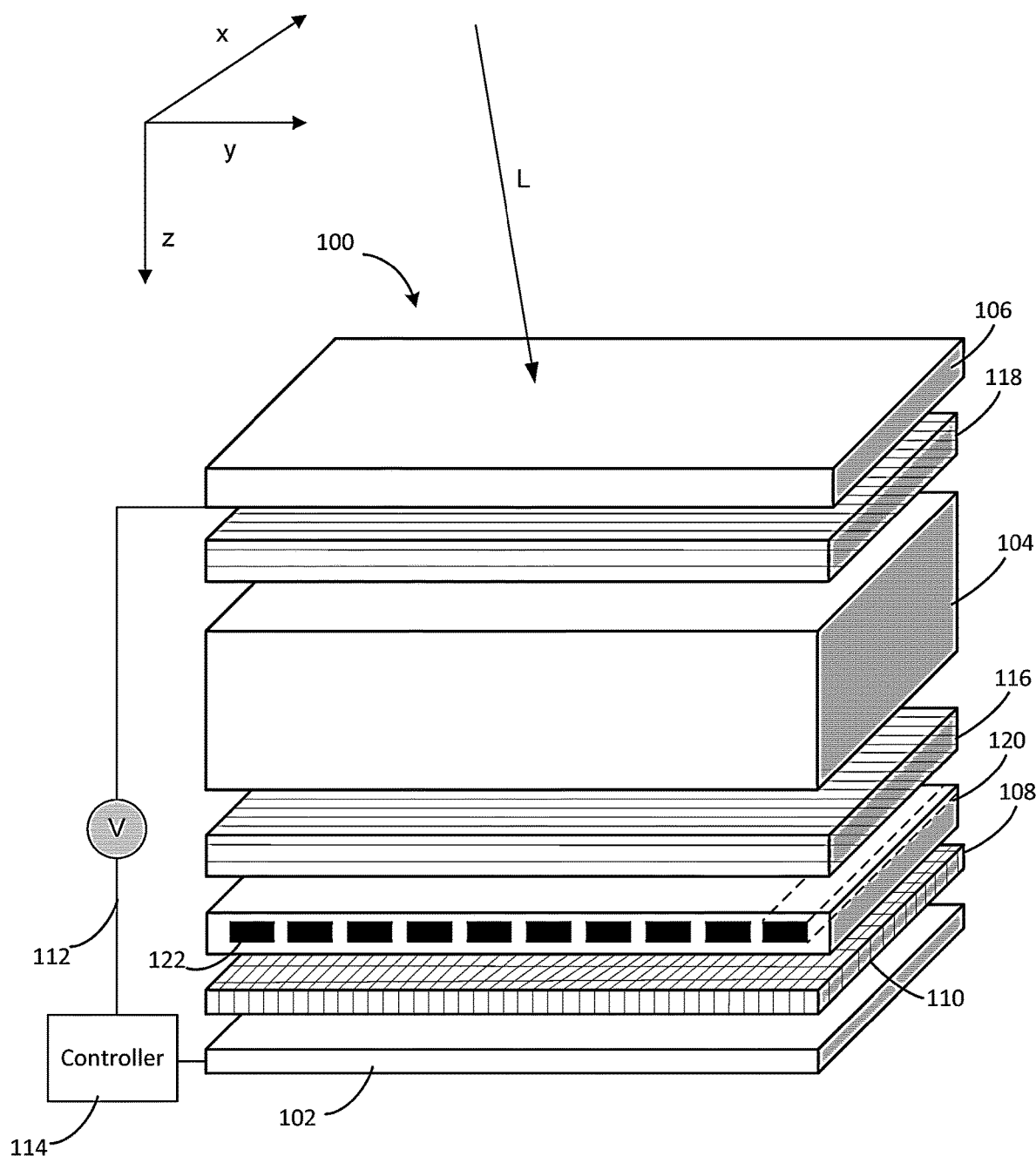
FIG. 1 is a perspective view of a liquid crystal on silicon spatial light modulator according to one embodiment of the present disclosure.

Referring initially to FIG. 1, a spatial light modulator of the present disclosure is illustrated in the form of a liquid crystal on silicon (LCOS) device. The LCOS modulator 100 is configured for use in a wavelength selective switch (WSS) or a plurality of WSS devices. However, LCOS modulator 100 may have applications in other devices. Overall, LCOS modulator 100 may be referred to as a spatial light modulator or optical phase modulator because it modulates the phase of an incident optical signal propagating in a propagation dimension (z dimension).

The LCOS modulator 100 as a spatial light modulator comprises a liquid crystal material 104, first and second electrodes 106 and 108, and a diffractive optical element 120. The electrodes 106, 108 are disposed on opposing sides of the liquid crystal material 104 and are configured to apply an electric potential across the liquid crystal material 104. The first electrode 106 (referenced here as an upper electrode) is at least partially transparent to allow passage of an incident wavefront of light into the liquid crystal material 104. (The incident wavefront of light is only schematically illustrated by arrow L.) The second electrode 108 is reflective so it can reflect incident wavefront of light L that has passed through the upper layers (electrode 106, liquid crystal material 104, etc.). The second electrode 108 (referenced here as a lower electrode) is divided into a two-dimensional array of independently electrically controllable pixels that extend laterally across the LCOS modulator 100.

The diffractive optical element 120 is disposed between the first and second electrodes 106, 108 and extends laterally across the LCOS modulator 100. The diffractive optical element 120 has an array of diffracting formations 122 formed from sub-wavelength structures. (As will be appreciated, these diffracting formations 122 are not drawn to scale.) As discussed in more detail below, the array of diffracting formations 122 defines a phase profile configured to modify the incident wavefront of light L reflected off the second electrode 108. This phase profile from the diffracting formations 122 is configured to apply a position-dependent wavefront correction to the incident wavefront of light. In the end, the effect of the phase profile defined by diffractive optical element 120 is to provide correction for wavelength-dependent optical aberrations in an optical system, such as in a WSS device.

Looking in more detail, the LCOS modulator 100 comprises a silicon substrate 102. Lower electrode 108 is mounted or adhered to the silicon substrate 102. Liquid crystal material 104 disposed between lower electrode 108 and upper electrode 106. Liquid crystal layer 104 typically has a thickness in the micron range, such as approximately 8 μm.

A controller 114 connects by an electrical circuit 112 to the lower electrode 108 (via the substrate 102) and to the upper electrode 106. The two-dimensional array 110 of independently electrically controllable pixels extend in both a first (x) and second (y) lateral dimension across the LCOS modulator 100. By way of example, upper electrode 106 may be formed of indium tin oxide (ITO). Lower electrode 108 may be formed of aluminum coated onto substrate 102 and connected to controller 114 by way of CMOS connections in substrate 102.

Using the electric circuit 112 connected to the upper electrode 106 and lower electrode 108, the controller 114 applies an electric potential V across liquid crystal material 104. The pixels of the array 110 electrically driven supply an electric potential V across the liquid crystal layer 104 between upper and lower electrodes 106 and 108 to orient the liquid crystals within layer 104 into a predetermined configuration. Each pixel in array 110 is individually driveable by electrical controller 114 at one of a number of predetermined voltage levels to provide a local phase modulation to an incident optical signal. Electrical control of the pixels is provided by interconnections to electrical controller 114 through silicon substrate 102. In response to the individually driven pixels, the liquid crystal layer 104 can be driven into a plurality of electrical states by the voltage drive signals provided to the lower electrode 108 by the electrical controller 114.

Pre-alignment of the liquid crystal materials within layer 104 may be provided by alignment layers 116 and 118. These layers 116 and 118 may include a plurality of small grooves aligned along a predetermined direction to define the slow axis of the liquid crystal material. In some embodiments, alignment layers 116 and 118 are formed of brushed polyimide.

Figure 2:
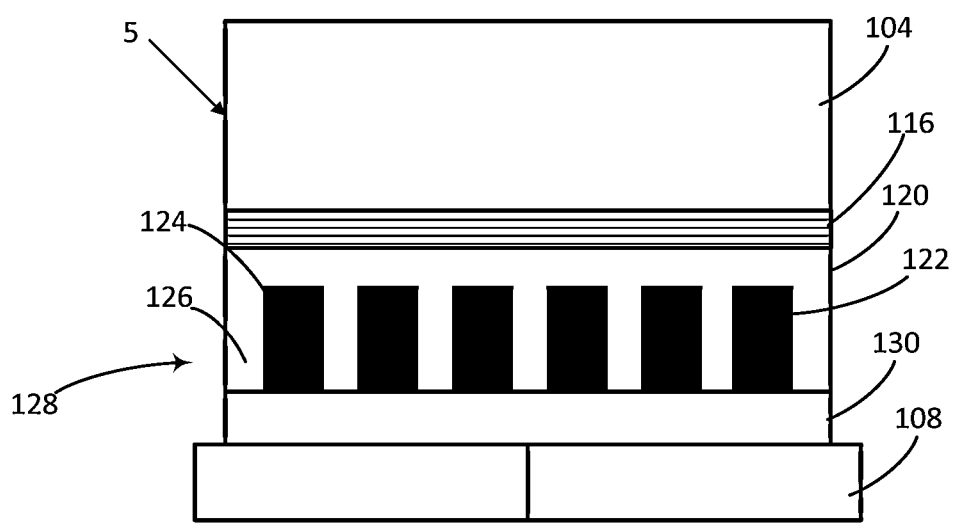
FIG. 2 is a side view of a section of the spatial light modulator of FIG. 1.

As noted above, LCOS modulator 100 also includes the diffractive optical element 120 disposed between the first and second electrodes 106 and 108 and extending laterally across the spatial light modulator. As best shown in FIG. 2, diffractive optical element 120 comprises an array of diffracting formations 122 formed of a first material 124 that is surrounded by one or more other materials. Here, the first material 124 is surrounded by second and third materials 126 and 130, which are dielectric materials having a low refractive index. In particular, the second and third materials 126 and 130 have a lower refractive index than that of the first material 124.

As discussed in more detail below, the array of diffracting formations 122 creates an optical phase profile adapted to modify the reflected wavefront of light L and to apply a position-dependent wavefront correction.

In embodiments described herein, diffractive optical element 120 can include a sub-wavelength grating. As a sub-wavelength grating, element 120 is unable to create diffraction into any higher orders.

In some embodiments, the diffracting formations 122 are metallic layers. In some embodiments, the metallic layers 122 are constructed from aluminum, and the surrounding region 126 comprises $SiO_2$.

In the embodiment illustrated in FIG. 2, the diffractive optical element 120 comprises a high contrast grating structure 128 that is also a sub-wavelength grating. As a high contrast grating (HCG), the high contrast grating structure 128 is a diffractive structure composed of bands with a high index of $n_H$, surrounded on all sides and filled by one or more materials of low index $n_{L1}$, $n_{L2}$, . . . , where the period p of the grating is in the range satisfying $\lambda/n_H < p < \lambda/n_L$, where $\lambda$ is the wavelength of the light, and $n_L$ is the refractive index of the surrounding material 126. For example, if $\lambda=1550$ nm, and $n_H=3.4$, $n_L=1.38$, then the period should be in the range of 455 nm to 1123 nm. In this range of periods, all non-zero diffraction orders are inhibited, while, depending on the design, the reflectance of the structure can be increased.

In the embodiment illustrated in FIG. 2, high contrast grating structure 128 comprises a locally periodic collection of high index diffracting formations 122 formed of the first material 124. High index diffracting formations 122 extend in a two-dimensional plane and are distributed with a spatial period that varies across the two-dimensional plane. These diffracting formations 122 are surrounded by second material 126 of a lower refractive index than first material 124 and disposed above a layer of third material 130, which is also of a lower refractive index than first material 124. Overall, the high contrast grating structure 128 preferably has a thickness in the range of 500 nm to 900 nm. In one embodiment, the overall high contrast grating structure 128 has a thickness of 600 nm.

Within high contrast grating 128, high index diffractive formations 122 may be formed of amorphous Silicon (amSi) or Silicon Rich Nitride (SRN) having a refractive index n in the range of 3.1 to 3.4. More generally, the first material 124 that forms diffractive formations 122 preferably has a refractive index greater than 3.

Diffractive formations 122 may have a thickness in the range of 300 nm to 500 nm. Preferably, the thickness of diffractive formations 122 is 350 nm.

Low index layer 130 is formed of a low refractive index material that is deposited during the initial stage of manufacture of the structure. Preferably, this low-index layer 130 is comprised of silicon dioxide ($SiO_2$), with a refractive index of 1.44. Low index layer 130 may also be comprised of another low index transparent dielectric material, such as aluminum oxide ($Al_2O_3$), zirconium oxide ($ZrO_2$), or titanium oxide ($TiO_2$).

Preferably, low index layer 130 has a thickness of less than 300 nm. In one embodiment, for example, the low-index layer 130 has a thickness of about 150 nm.

Surrounding material 126 may comprise either $SiO_2$ with a refractive index of 1.44, another low index transparent dielectric material, or a spin-on glass (SOG) material comprising an organosilicon-based polymer. By way of example, material 126 may comprise Accuglass T14 Spin-on-Glass sold by Honeywell Electronic Materials, which has a refractive index n of 1.38.

In a particular example, surrounding material 126 is preferably composed of a low refractive index material that can be applied by spin coating. Spin coating has the advantageous property that it can fill the gaps between the diffractive formations 122 and create a very thin, stable and homogeneous high contrast grating structure, which can then be incorporated into the spatial modulator. While surrounding material 126 is preferably Accuglass T14, it will be appreciated that it may also be comprised of another suitable low-index material that can be spin coated, such as Level-M10 or PMMA. Surrounding material 126 can also be the same material as used in the under layer 130 and may be deposited by other means than spin coating leading to filling of the gaps. Preferably, the refractive index of materials 126 and 130 are both less than 1.65.

The thicknesses of diffractive formations 122 and/or the layers of high and low refractive index material 124 and 126 of high contrast grating 128 may be fabricated to vary laterally across LCOS modulator 100. In some embodiments, thicknesses of diffractive formations 122 vary but have a mean thickness of 350 nm.

The spatial period of diffractive formations 122 varies across structure 128 and, in some embodiments, the spatial period of diffractive formations 122 varies over a range of 450 nm to 950 nm. In some embodiments, the diffractive formations 122 are positioned such that the array has a mean period at or around 700 nm (e.g., ±5%, 10%, etc.). The maximum spatial period p is given by the formula $p < \lambda/n_L$ where is the refractive index of surrounding material 126.

The high contrast grating 128 preferably has a mean spatial duty cycle of around 50%. The spatial duty cycle represents the ratio of the width of the diffractive formations 122 to the width of the adjacent regions of second material 126. At a 50% duty cycle, the widths of diffractive formations 122 are the same as the regions of lower refractive index material 126 between them. However, the duty cycle may be higher or lower than 50% and may vary across diffractive formation 12. Changing the duty cycle affects the reflection efficiency of diffractive optical element 120.

The HCG reflection efficiency of the high contrast grating 128 may be polarization-dependent, in which case the grating orientation needs to be designed to match with the intended polarization of the incident light field to be modified. In some circumstances, it is possible to design the high contrast grating 128 that creates polarization-independent reflection enhancement.

During manufacture of LCOS modulator 100 of FIG. 1, a number of parameters of diffractive optical element 120 are able to be defined so as to provide a phase profile configured to modify the reflected wavefront of light and configured to apply a position-dependent wavefront correction to the incident wavefront of light. These parameters include:

The absolute or mean thickness of diffractive formations 122.

The absolute or mean width of diffractive formations 122 in a lateral dimension across LCOS modulator 100.

The absolute or mean spatial period of diffractive formations 122 in a lateral dimension.

The absolute or mean duty cycle of high contrast grating 128.

The refractive indices of the diffractive structures 122 and of the surrounding regions 126 and 130.

The degree of curvature or shape of grating lines (defined by arrays of diffractive formations 122) that have curvature in a lateral direction across LCOS modulator 100.

By controlling the above parameters, a phase profile can be defined within diffractive optical element 120 that provides a predefined position-dependent wavefront correction.

Examples of wavefront shaping and correction that can be accomplished include spherical or cylindrical lensing, cylindrical lensing with focal length changing in the transverse axis, or multi-zone focusing effects (e.g. formation of a lens array, periodic in one or two dimensions). A permanent tilt can also be applied to the wavefront.

It will be appreciated that wavefront correction functions can also be achieved using the active control of the LCOS-based spatial light modulator 100 itself, but applying such functions dynamically uses phase provided by the spatial light modulator. The maximum amount of phase that can be applied is limited by the maximum level of voltage that can be supplied for a given cell thickness. In order to permit effective control of individual pixels without the domination of fringing fields, the cell thickness is in turn limited by the pixel size of the spatial light modulator. As a benchmark the cell thickness should be less than the pixel dimension. Therefore, adding a permanent phase bias to create wavefront correction operations can desirably optimize the LCOS modulator 100 as a spatial light modulator for a dedicated optical function, such as for switch engine for a telecommunications WSS device.

In some embodiments, the wavefront correction can comprise providing a position-dependent focusing effect to the incident wavefront of light. This position-dependent focusing effect may impart a phase change similar to that of a Fresnel lens. This is functionally similar to the phase retardation imposed on a wavefront by a bulk lens. The position-dependent focusing effect may comprise focusing or defocusing at least a part of the incident wavefront along an optical axis of a WSS device or other system in which LCOS modulator 100 is incorporated.

Figure 3:
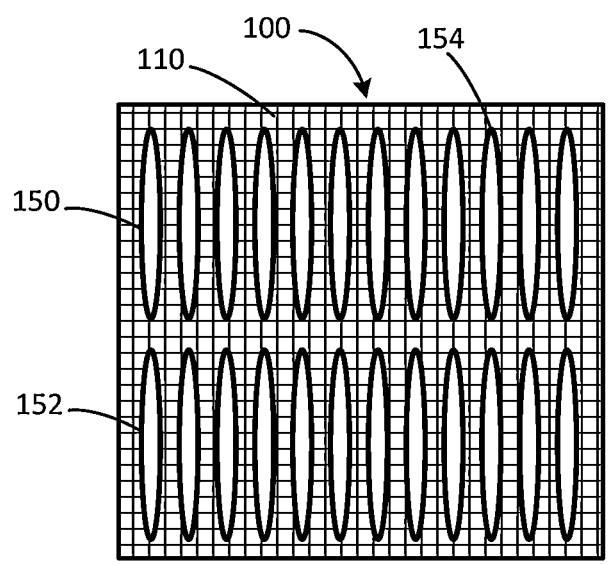
FIG. 3 is a schematic plan view of a pixelated LCOS device showing elongated beams corresponding to wavelength channels incident therein.

Referring to FIG. 3, a plan view is illustrated of LCOS modulator 100 and shows the 2D array of pixels 110. Also, two rows 150 and 152 of elongated wavelength channels (e.g. 154) are shown and are incident onto LCOS modulator 100. As illustrated, when used in a WSS device, the different wavelength channels are shaped and directed onto LCOS modulator 100 at different spatial locations. The two-dimensional array of independently electrically controllable pixels are partitioned into different predefined spatial regions so as to perform independent switching for each wavelength channel. The phase profile of diffractive optical element 120 can be defined so as to provide local focusing or defocusing at specific locations across the array such as corresponding to predetermined groups of wavelength channels or peripheral regions, or to different WSS devices multiplexed onto the same LCOS spatial light modulator.

The wavefront correction may also comprise providing a position-dependent beam steering effect to selectively orient the direction of at least a part of the incident wavefront of light along an optical axis of a WSS device or other system in which LCOS modulator 100 is incorporated. In some embodiments, the beam steering effect is achieved by applying a phase ramp function that acts to steer the beam in a similar manner to the way the LCOS device performs beam steering. In this example, diffractive optical element 120 can take some of the steering burden off the LCOS device where wavefront shaping can be applied permanently (as opposed to dynamically to switch between optical outputs).

Referring again to FIG. 3, the phase profile of the diffractive optical element 120 may be defined so as to provide local beam steering at specific locations corresponding to predetermined groups of wavelength channels or peripheral regions of LCOS modulator 100. The position-dependent focusing and beam steering effects may be applied in orthogonal dimensions. By way of example, optical beams may be focused in the x dimension and steered in the y dimension illustrated in FIG. 1.

In operation in a WSS device, diffractive optical element 120 defines a phase surface that imparts a phase change as a function of position to an incident optical beam. In some embodiments, this phase change as a function of position is designed to have the effect of creating an optical lensing function. The phase surface may be defined initially by an optical model for a given WSS. This optical model may be simulated on a computer using modelling software. The computer model can be used to derive a corresponding physical profile of diffractive optical element 120 which can subsequently be fabricated.

Wavefront shaping and correction is accomplished by curving the diffractive formations 122 of high contrast grating 128, so that the period of the grating changes as a function of position. A beam reflected from a grating of a given period is given a phase delay which depends on the period, so if the period changes spatially across the grating, then the phase modification applied to the beam, in turn, is spatially varying.

The local phase created by a diffractive element with a given local period is found by modeling the complex reflectivity of the diffractive structure using a rigorous coupled wave model such as provided in the software package GD-Calc from KJ Innovation, and extracting the phase component of the response. Design parameters of the diffractive structure that can be employed in order to control the range of the local phase include thickness and refractive index of the diffracting formations 122, refractive index of the surrounding material 126, and thickness and refractive index of the low index layer 130.

After a grating design having a phase response that varies as the period varies is obtained, then a mapping of period-to-phase is calculated. The period p required for the diffractive structure to create a given target phase $\phi$ at a spatial location (x,y) on the LCOS surface is obtained, for example, as $p=A\phi^2+B\phi+C$, for constants A, B, C. Arbitrary wavefront shaping phase profiles are imprinted onto the diffractive structure 120 by mapping the period at each location to the targeted relative phase, which is found by modeling the desired wavefront correction using a modeling program such as Zemax. The phase profile is not polarization-dependent.

It can also be desirable when designing a HCG to additionally vary the duty cycle as the period is changed, in order to maintain a high reflection efficiency.

A grating design having a suitable phase variation as the period is varied has the following parameters: The diffractive formations 122 are comprised of silicon with a refractive index of 3.39 and thickness of 350 nm. The low-index layer 130 is comprised of $SiO_2$, with a refractive index of 1.44 and with a thickness of 150 nm. The surrounding material 126 is comprised of SOG, with refractive index of 1.38, and it extends by 50 to 100 nm above the diffractive formations. This design will create phase differences ranging between −180° and +180° as the period is varied between 450 nm to 950 nm, and it maintains a reflectivity of at least 95% over that range of periods, for light polarised parallel to the diffractive formations 122.

Figure 4:
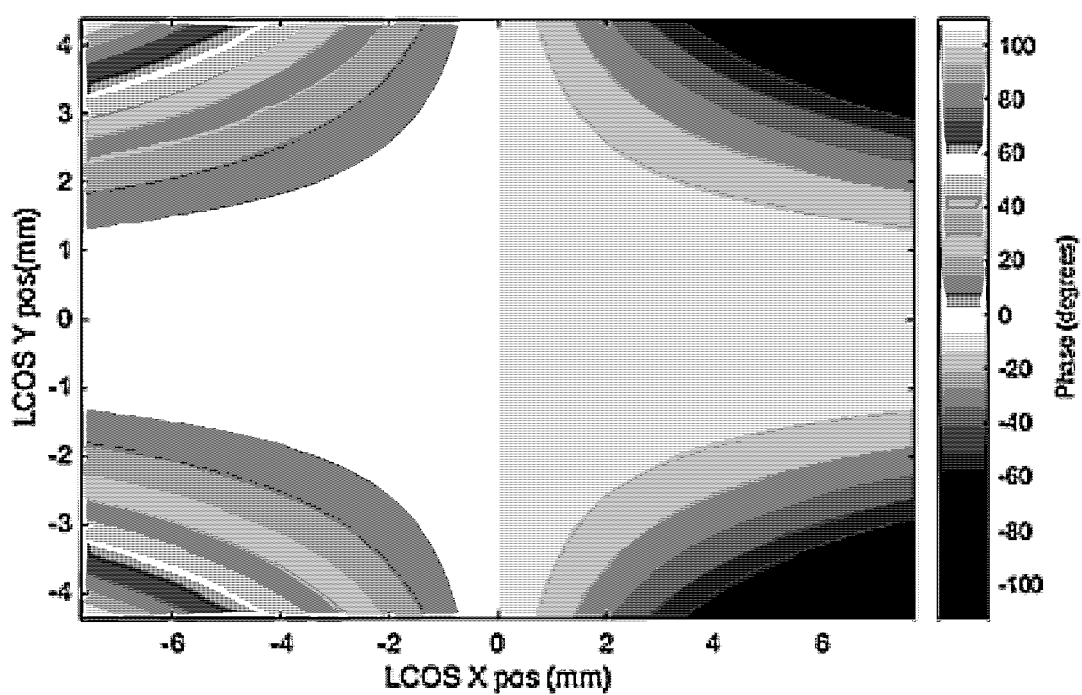
FIG. 4 illustrates a phase surface profile as a function of position across an LCOS device adapted to create a focusing effect on incident light.
Figure 5:
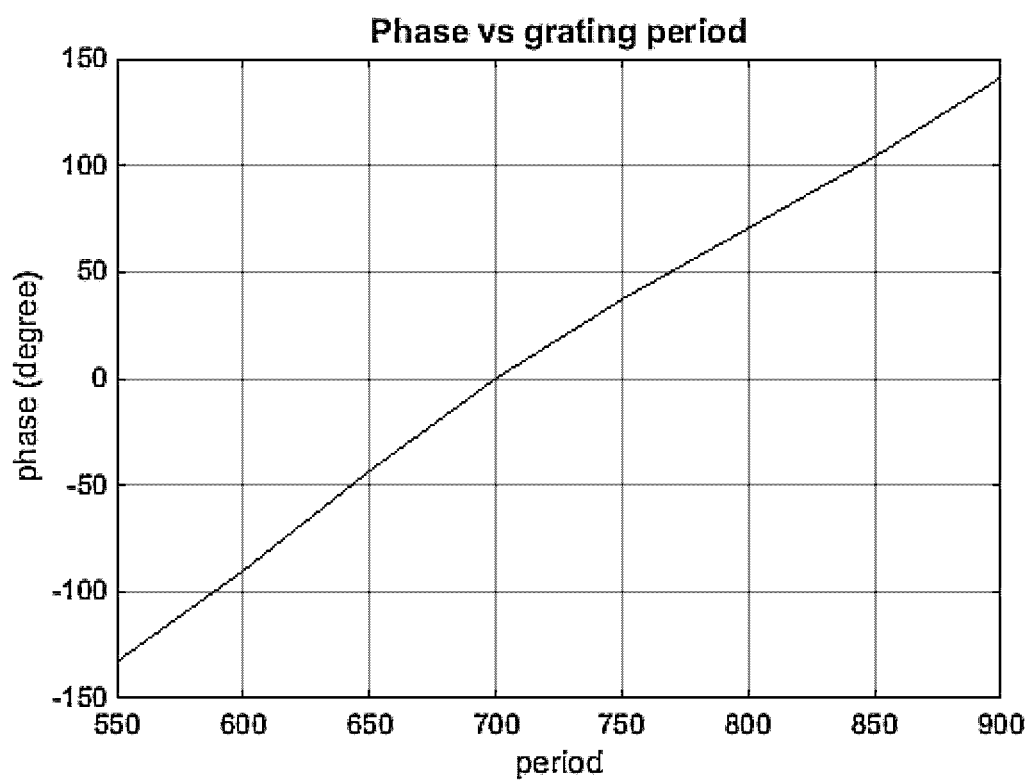
FIG. 5 is a graph of phase change as a function of diffraction grating period.

Referring now to FIG. 4, an exemplary phase surface profile is illustrated. The phase surface profile is configured to create a variable focusing effect (focusing they axis of beam, with focal length varying in the x axis) from device (100; FIG. 1). The phase profile represents the phase front correction that would be applied to an incident optical wavefront. The desired phase change can be mapped using the equation mentioned above to the required local period of the diffractive optical element 120. For further reference, FIG. 5 illustrates an exemplary graph of phase versus period for a given high contrast grating that illustrates how a phase change maps to period.

Figure 6:
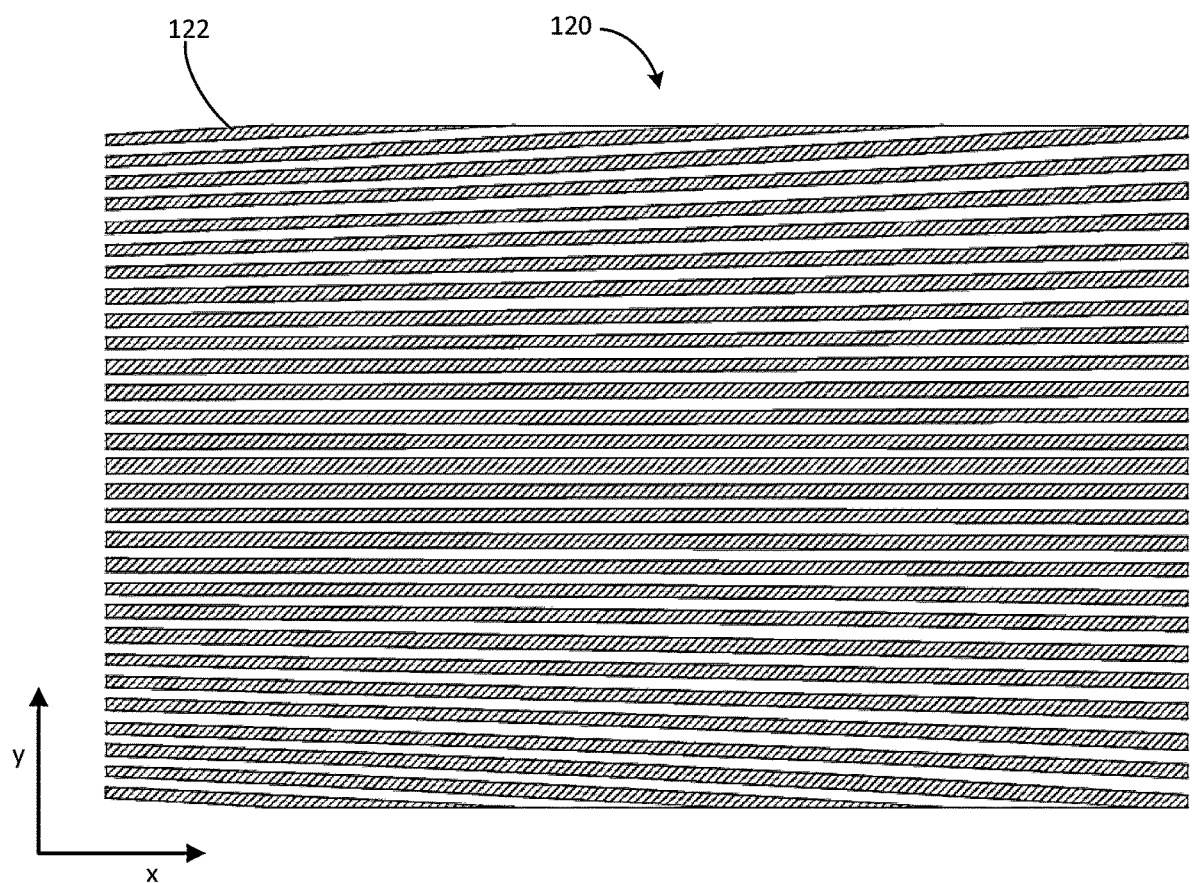
FIG. 6 is a schematic illustration of a grating structure corresponding to the phase surface of FIG. 4 adapted to create a focusing effect on incident light.

FIG. 6 schematically illustrates a corresponding grating structure that creates a focusing effect (focusing y axis of beam, with focal length varying in the x axis). This grating structure can be used for the diffractive optical element disclosed herein. As illustrated, the grating structure of diffractive optical element 120 includes grating lines (formed from diffractive formations 122 comprised of the higher refractive index material 124) that diverge from left to right such that the period is larger on the right than on the left. Although appearing to be close to straight lines, it will be appreciated that, as a result of the left-to-right divergence, the diffractive formations 122 are curved, and the degree of curvature may change across LCOS modulator 100.

As noted above, the effect of the phase profile defined by diffractive optical element 120 is to provide correction for wavelength-dependent optical aberrations in an optical system, such as in a WSS device. Referring now to FIGS. 7 and 8, a schematic of a WSS device 200 is illustrated. WSS device 200 includes an array of input fibres 202, a pair of lenses 204 and 206, a diffraction grating 208, and an LCOS device 210. The pair of lenses 204 and 206 are disposed symmetrically about diffraction grating 208. As shown in FIG. 8, an additional switching lens 212 may be used in the switching axis and positioned adjacent to diffraction grating 208.

In the wavelength dispersive axis shown in FIG. 7, beams are spatially separated at LCOS 210, by use of dispersion from diffraction grating 208 and imaging lens 206. In the orthogonal switching axis shown in FIG. 8, the optical system is designed to be collimated. There are simplified optical designs that can be used, where this collimation is not equal across all wavelengths. Such designs require aberration corrections at this LCOS plane so that the light can get back into the output fibres without unwanted insertion loss.

In FIG. 8, the dashed lines illustrate rays refracted at different angles due to aberrations in the optical system. The aberrations can be created by any one of the optics in the optical train and can be corrected by the LCOS 210 according to embodiments of the present disclosure.

Because of the beam separation in the wavelength dispersive axis, each wavelength can be addressed by different sections of the LCOS 210. By applying appropriate phase adjustment at the LCOS 210, each of these beams can be re-focused accurately back into the fibre, which reduces overall system loss.

In a conventional LCOS spatial light modulator device, this phase adjustment could be applied by the LCOS pixels themselves, but this detracts from the phase control that is required to perform switching and attenuation for the WSS system. In the present disclosure, the diffractive optical element (120; FIGS. 1-2) in the LCOS 210 provides a fixed phase Kino form into the backplane of the LCOS 210, to provide a position-dependent focusing without detracting from the phase required for standard functionality.

In some optical systems, multiple WSS devices can leverage a single LCOS spatial light modulator device (100; FIG. 1) to perform switching between input and output ports. In these systems, the wavelength channels switched by the different WSS devices are directed onto different regions of the LCOS device. By way of example, in FIG. 3, row 150 of wavelength channels may relate to a first WSS device and row 152 may relate to a second WSS device. The different spatial regions (e.g. those corresponding to the two rows 150 and 152) are configured to independently control different WSS devices.

Figure 9:
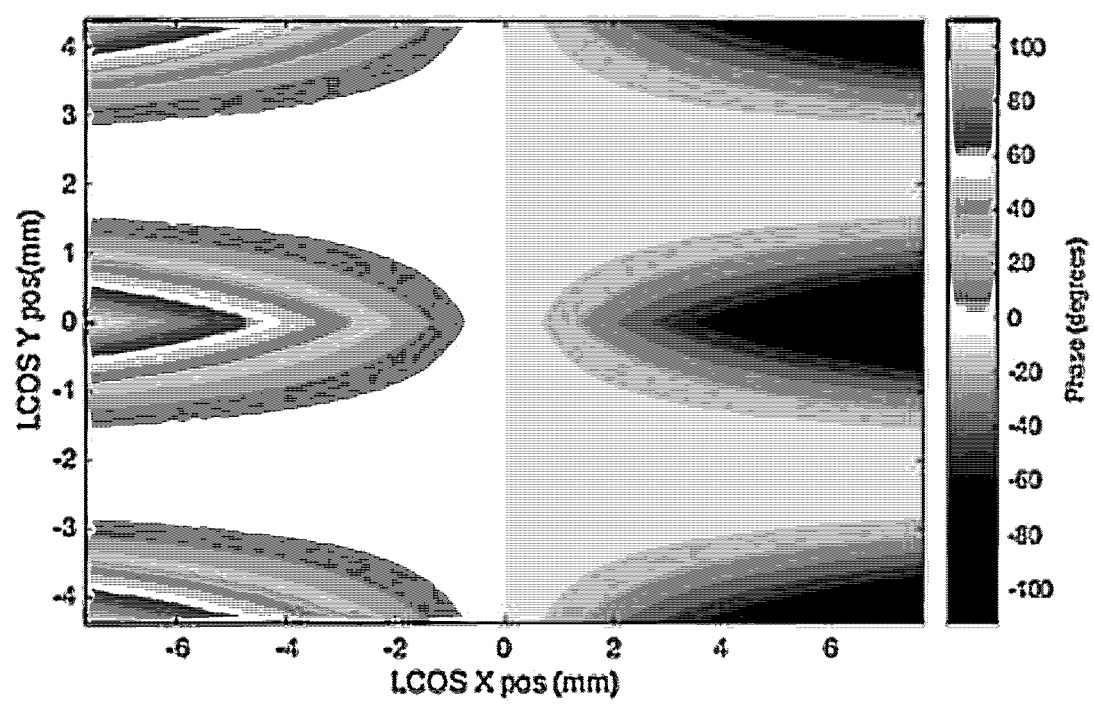
FIG. 9 illustrates a phase surface profile as a function of position across an LCOS device adapted to create two regions of focusing of incident light.

In these systems of multiple WSS devices, different spatial segments of the diffractive optical element 120 corresponding to the different spatial regions can be configured to apply a unique and independent phase profile to each spatial region and therefore each WSS device. Referring now to FIG. 9, another exemplary phase profile is illustrated. This phase profile is configured to create two regions of focusing (y axis focused, varying in the x axis, top and bottom regions independent of each other). For further reference, FIG. 10 schematically illustrates a corresponding grating structure for a diffractive optical element 120 that can achieve the phase profile of FIG. 9.

Figure 10:
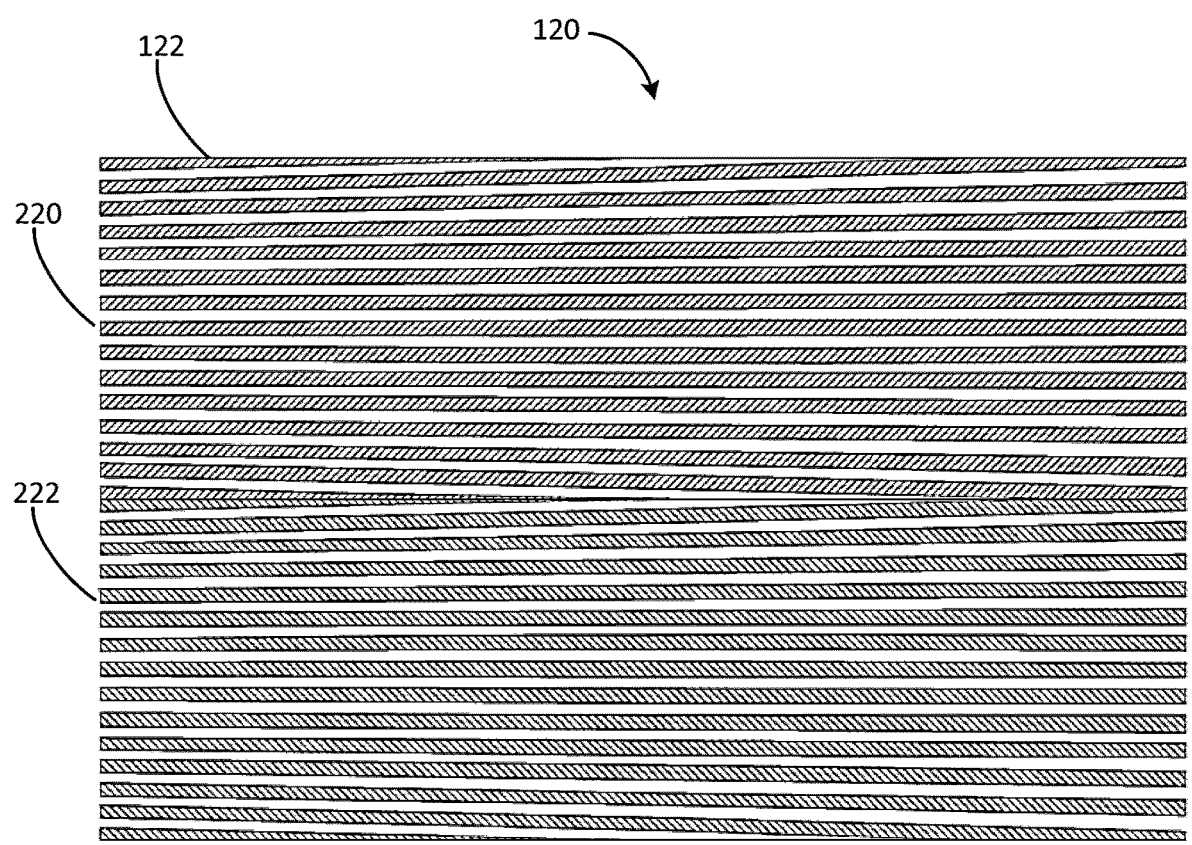
FIG. 10 is a schematic illustration of a corresponding grating structure that can achieve the phase profile of FIG. 9.

As illustrated in FIG. 10, for example, a top region 220 provides a first position-dependent focusing effect while a bottom region 222 provides a second position-dependent focusing effect. Both regions 220, 222 include diffractive formations 122 in the form of lines that diverge from left to right such that the period of the lines increases from left to right. Such a two-region profile may be used to provide independent focusing adjustment to beams of two different WSS devices.

Figure 11:
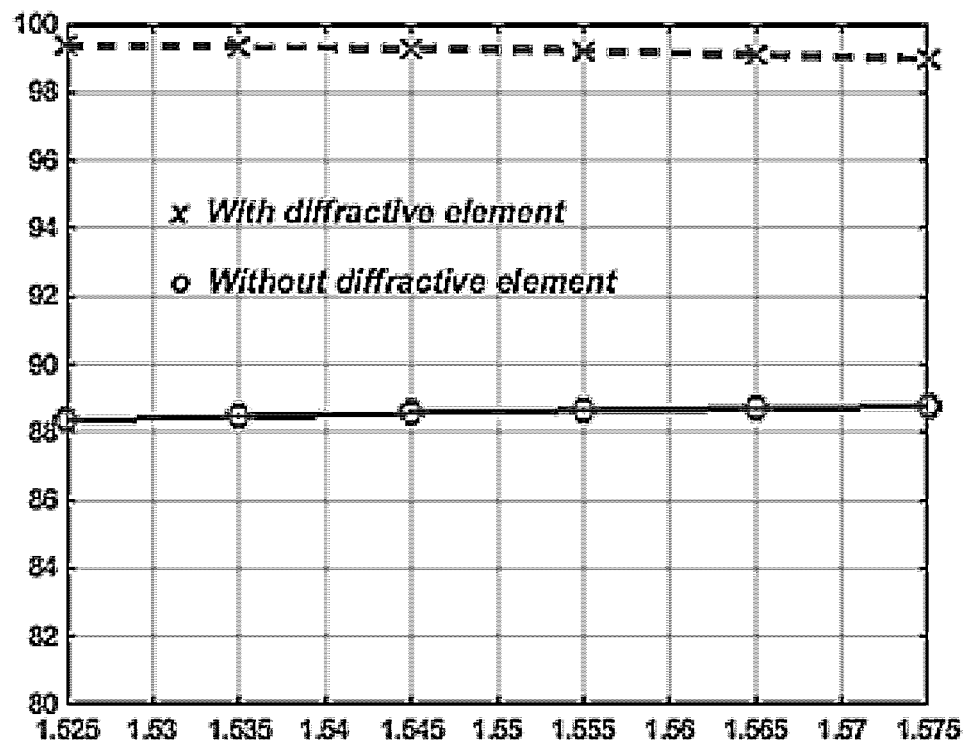
FIG. 11 is a graph of reflectivity versus wavelength of a spatial light modulator containing a diffractive optical element for a chosen polarization (dashed line) and a spatial light modulator that does not include a diffractive optical element (solid line).

In addition to the ability of the diffractive optical element 120 to apply position-dependent wavefront correction to an incident beam, it can also be designed to enhance the reflectivity of LCOS modulator 100. Referring now to FIG. 11, there is illustrated a graph of reflectivity versus wavelength of a spatial light modulator containing a diffractive optical element for a chosen polarization (dashed line) and a spatial light modulator that does not include a diffractive optical element (solid line).

As a result, the reflection efficiency of LCOS modulator 100 can be increased compared to the efficiency without the presence of diffractive optical element 120.

2. Method of Manufacturing

Having an understanding of a spatial light modulator, such as LCOS modulator 100 described above according to the present disclosure, details of how such a device may be manufactured by a process as described below.

Initially, layers of $SiO_2$ and amSi or SRN of the required thickness are deposited onto an electronic pixelated die (which forms lower electrode 108 in FIG. 1). Next, a master phase mask suitable for UV exposure is determined from a model of the required phase profile to achieve a particular wavefront shaping. The master phase mask is laid out and fabricated. The coated die is further coated with photoresist material and other chemicals as required in photolithography. The die is then exposed by UV light which has been imaged through the phase mask.

Following UV exposure, the unexposed photoresist material is preferentially removed and then the layer structure is etched to create the diffractive formations 122. The remaining photoresist is then cleaned off to reveal the diffractive optical element 120.

A thin layer of SOG is then spin-coated over the etched structure, filling the etched spaces and adding an additional thin over-layer. The LCOS assembly is then built as per the normal procedure, incorporating the diffractive optical element 120 therein.

Throughout this specification, use of the term "optical" in the sense of optical signals, optical wavelengths or the like is intended to refer to electromagnetic radiation in any one of the visible, infrared, or ultraviolet wavelength ranges. Throughout this specification, use of the term "element" is intended to mean either a single unitary component or a collection of components that combine to perform a specific function or purpose. Additionally, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. A spatial light modulator comprising:
   a liquid crystal material;
   first and second electrodes disposed on opposing sides of the liquid crystal material and being configured to apply an electric potential across the liquid crystal material, the first electrode being at least partially transparent to allow passage of an incident wavefront of light into the liquid crystal material, the second electrode being reflective and being divided into a two-dimensional array of independently electrically controllable pixels that extend laterally across the spatial light modulator; and
   a diffractive optical element disposed between the first and second electrodes and extending laterally across the spatial light modulator, the diffractive optical element having an array of diffracting formations formed from sub-wavelength structures,
   wherein the array of diffracting formations define a phase profile, the phase profile being configured to modify the incident wavefront of light reflected off the second electrode and being configured to apply a position-dependent wavefront correction to the incident wavefront of light, wherein the wavefront correction applied by the phase profile is configured to provide a position-dependent focusing effect to the incident wavefront of light.

2. The spatial light modulator of claim 1, wherein the position-dependent focusing effect is configured to focus or defocus at least a part of the incident wavefront of light.

3. The spatial light modulator of claim 1, wherein the wavefront correction applied by the phase profile is configured to provide a position-dependent beam steering effect to selectively orient a direction of at least a part of the incident wavefront of light.

4. The spatial light modulator of claim 3, wherein the position-dependent focusing and beam steering effects are applied in orthogonal dimensions.

5. The spatial light modulator of claim 1, wherein the diffractive optical element comprises a sub-wavelength grating structure.

6. The spatial light modulator of claim 1, wherein the diffractive optical element comprises a high contrast grating structure formed of a first material surrounded by one or more second materials, the first material having a high refractive index, the one or more second materials having a lower refractive index than the first material.

7. The spatial light modulator of claim 6, wherein the first material is: a refractive index greater than 3, a refractive index in the range of 3.1 to 3.4, amorphous silicon, or silicon rich nitride.

8. The spatial light modulator of claim 6, wherein the second material is a spin-on glass material comprising an organosilicon-based polymer.

9. The spatial light modulator of claim 6, wherein the high contrast grating structure comprises the array of diffracting formations extending in a two-dimensional plane, the diffracting formations being distributed with a spatial period that varies across the two-dimensional plane.

10. The spatial light modulator of claim 6, wherein:
    the high contrast grating has a period that varies laterally across the spatial light modulator over a range of 450 nm to 950 nm;
    the high contrast grating has a mean period of 700 nm;
    the high contrast grating has a thickness in the range of 500 nm to 900 nm; or
    the high contrast grating has a mean duty cycle of 50%.

11. The spatial light modulator of claim 6, wherein the diffracting formations of the high contrast grating have a high index and are completely surrounded by one or more lower index dielectric materials.

12. The spatial light modulator of claim 6, wherein the high contrast grating includes a profile of curved grating lines that have curvature in a lateral direction across the spatial light modulator.

13. The spatial light modulator of claim 6, wherein thicknesses of the first material and the one or more second materials of the high contrast grating vary laterally across the spatial light modulator.

14. The spatial light modulator of claim 1, wherein the spatial light modulator is configured for use in a given wavelength selective switch (WSS) having an optical model; and wherein the diffractive optical element defines a phase surface configured to impart a permanent phase change as a function of position, the phase surface being defined by the optical model for the given WSS.

15. The spatial light modulator of claim 1, wherein the diffractive optical element defines a phase surface configured to impart a phase change as a function of position, the phase change being configured to create an optical lensing function.

16. The spatial light modulator of claim 1, wherein a reflection efficiency of the spatial light modulator having the diffractive optical element is increased compared to an efficiency of the spatial light modulator without the diffractive optical element.

17. A wavelength selective switch comprising a spatial light modulator according to claim 1.

18. A spatial light modulator comprising:
    a liquid crystal material;
    first and second electrodes disposed on opposing sides of the liquid crystal material and being configured to apply an electric potential across the liquid crystal material, the first electrode being at least partially transparent to allow passage of an incident wavefront of light into the liquid crystal material, the second electrode being reflective and being divided into a two-dimensional array of independently electrically controllable pixels that extend laterally across the spatial light modulator; and
    a diffractive optical element disposed between the first and second electrodes and extending laterally across the spatial light modulator, the diffractive optical element having an array of diffracting formations formed from sub-wavelength structures,
    wherein the array of diffracting formations define a phase profile, the phase profile being configured to modify the incident wavefront of light reflected off the second electrode and being configured to apply a position-dependent wavefront correction to the incident wavefront of light, wherein the two-dimensional array of independently electrically controllable pixels is partitioned into different spatial regions configured to perform independent switching.

19. The spatial light modulator of claim 18, wherein the different spatial regions are configured to independently control different WSS devices.

20. The spatial light modulator of claim 18, wherein different spatial segments of the diffractive optical element correspond to the different spatial regions, and wherein the different spatial segments are configured to apply a unique and independent phase profile to each spatial region.

* * * * *

UNITED STATES PATENT AND TRADEMARK OFFICE
CERTIFICATE OF CORRECTION

PATENT NO. : 11,940,686 B2  
APPLICATION NO. : 17/658922  
DATED : March 26, 2024  
INVENTOR(S) : Luke Stewart et al.

Page 1 of 1

It is certified that error appears in the above-identified patent and that said Letters Patent is hereby corrected as shown below:

On the Title Page

In Item (72) change -- GLEN W. BAXTER -- to "GLENN W. BAXTER"

Signed and Sealed this  
Sixteenth Day of September, 2025

Coke Morgan Stewart  
*Acting Director of the United States Patent and Trademark Office*